Patented Aug. 6, 1929.

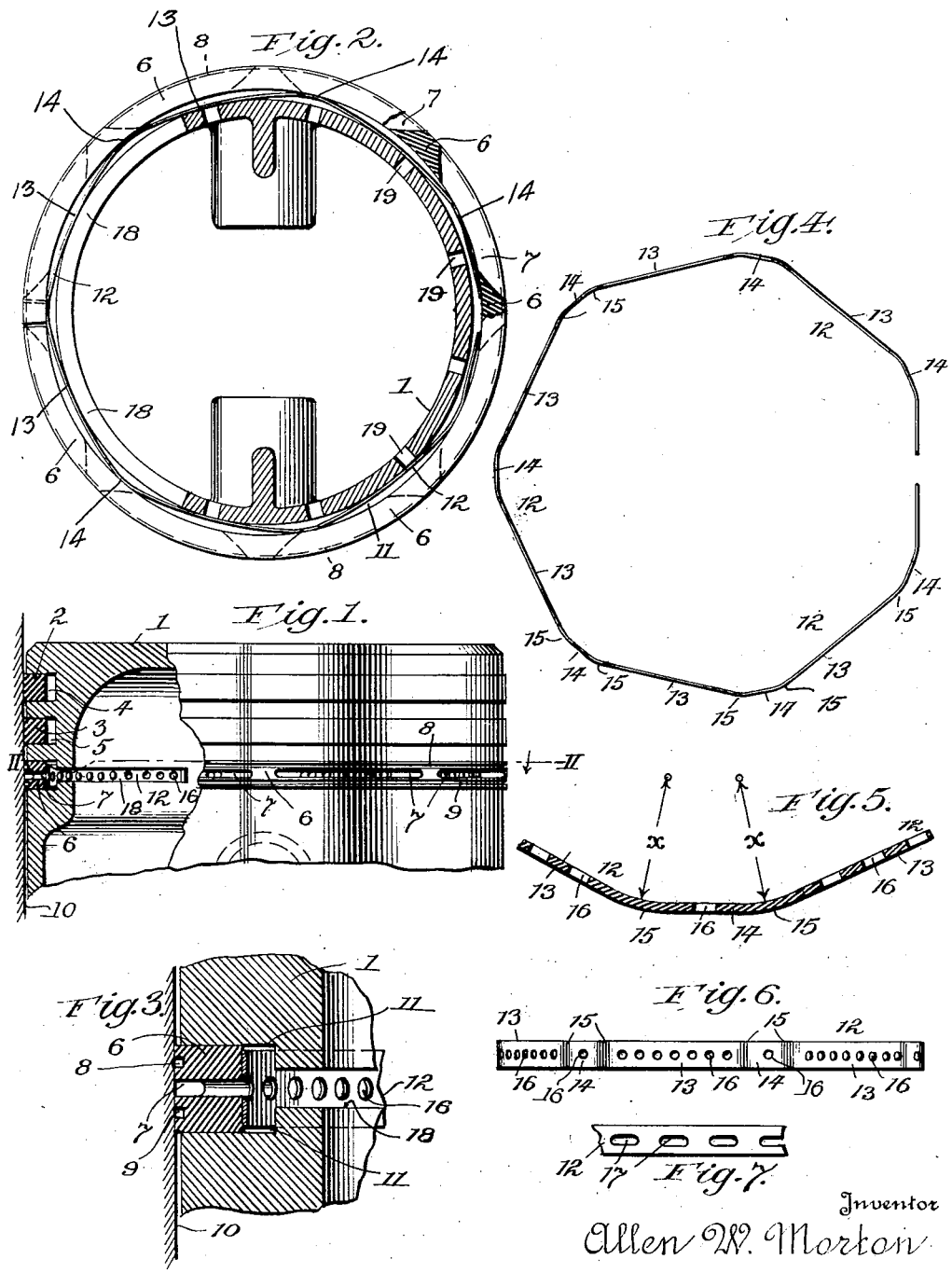

1,723,432

UNITED STATES PATENT OFFICE.

ALLEN W. MORTON, OF BALTIMORE, MARYLAND, ASSIGNOR TO THE AMERICAN HAMMERED PISTON RING COMPANY, OF BALTIMORE, MARYLAND, A CORPORATION OF MARYLAND.

PISTON RING.

Application filed May 19, 1928. Serial No. 279,155. REISSUED

This invention pertains to piston rings and relates more particularly to that type commonly known in the art as oil rings.

The invention has for its main object the production of a ventilated oil ring comprising in its broader aspect the combination of an outer ventilated cylinder contacting ring and an inner relatively light ventilated ring, the structure thus composed being more especially adapted for use in a piston groove having drainage openings extending therefrom to the interior of the piston.

The present structure, while effecting proper drainage, also provides a structure which tends to do away with the so-called piston slap which often inheres in engines where the piston and rings become worn and is also a means of increasing the tension in the piston ring, particularly in the oil ring, without injurious results.

An embodiment of my invention is disclosed in the annexed drawings wherein:

Figure 1 is a side elevation, partly in section, of a portion of a piston showing a ring arrangement embodying my invention, Figure 2 a transverse horizontal sectional view on the line II—II of Figure 1, Figure 3 a detail sectional view of a portion of the piston and oil ring on an enlarged scale, Figure 4 a plan view of the inner spring or expander ring, Figure 5 a detail sectional view of such element upon an enlarged scale, Figure 6 a face view of said element, and Figure 7 a detail view illustrative of a modified form of perforation formed in the inner ring.

Referring to the drawings, Figures 1 to 6 both inclusive, 1 denotes a portion of a piston having the usual rings 2 and 3 located in grooves 4 and 5, respectively, adjacent the head of the piston and above the oil ring.

The oil ring in the broader aspect of the invention may be of any approved form so long as it is of the ventilated type. I prefer, however, to employ a ring of the form shown wherein the body 6 is rectangular in cross section and is provided with a series of slots or openings 7 extending from the inner to the outer face, said slots being wider at the outer than at the inner face of the ring, as best seen in Figure 2.

The outer cylinder contacting face of the ring will also be provided with two grooves 8 and 9 located one to each side of the slots and extending entirely around the ring. The edges of these grooves, it may be stated serve to scrape the oil from the cylinder surface 10, and likewise tend to distribute sufficient oil over the cylinder face to insure proper lubrication.

Ring 6, which is seated in a groove 11, is formed of any suitable material and normally expands so as to contact the cylinder wall. To centralize the ring with reference to the piston, and hence with reference to the cylinder, I employ an inner expander element 12, which, for the purpose of brevity, I term an expander ring. Said member is produced from spring strip metal and is preferably bent to the contour (in plan) shown in Figures 2, 4 and 5.

As will be seen upon reference to said views the ring is formed with a series of long flat or straight sections 13 and a series of short flat sections 14. The longer flat sections 13 may be of any desired length but the length of the short sections 14 will be such as to be shorter than the radius X of the curved sections 15 which interconnect the various long and short sections. Thus if a short section 14 is say one quarter inch in length the radius X should exceed that but of course be less than the radius of the ring.

By thus contouring the expander ring it will assume the position shown in Figure 2 with reference to the inner face of ring 6 and the rear or inner face of the groove 11 providing sufficient zones of contact between the elements to insure the exertion of an outward and equal expansive force against the oil ring 6.

Furthermore, it is to be noted that the expander ring presents no sharp bends or angles in its make-up. This is of advantage in that no incipient line of fracture is presented or produced and further there will be little or no appreciable wear between the two rings. Where a sharp angle or bend is produced in the expander ring, it will not only cause excessive unit pressure between the expander ring and the piston ring at these bends or points of contact, but will also wear and cut into the outer ring thereby weakening it. More frequently, however, the expander will itself break at these sharp corners or bends.

Ring 12 has formed therein a plurality of openings 16, shown in Figures 1, 3, 5 and 6 as being round. Preferably but a single opening will be produced in the short sections 14 in order to not unduly weaken the same and in fact the openings in the short sections may be omitted without unduly cutting down the efficiency of the drainage of the device.

The form of the openings through the expander ring is immaterial and they may, for instance, be elongated as shown at 17, Figure 7.

The inner wall of groove 11—or that portion of the piston which lies inward of the groove—is ported for the passage of oil. Such porting may be effected as by an elongated slot 18 as shown in Figures 1 and 3 and at the left hand portion in Figure 2, or by a series of openings 19 as illustrated at the right in Figure 2. In either case passage for the inward drainage of oil removed from the cylinder by the ring 6 is afforded.

It is thought that the operation of the structure will be appreciated by those skilled in the art but a brief résumé will be given.

Invariably after piston rings have been in service for some time the edges of the rings become rounded due to wear, and when in certain instances the pistons and rings fit comparatively loosely in the cylinder, the outer or cylinder contacting faces of the rings wear most pronouncedly convex. When such a condition arises it is obvious that only the center line of any particular ring is in continuous contact with the walls of the cylinder.

Now, assuming that the piston is moving downwardly, in Figures 1 and 3, then the ring 6 will tend to scrape the excess oil from the face of the cylinder, and its action will be somewhat as follows: A certain amount of oil will be scraped from the walls of the cylinder by the lower edge of the ring 6 and an additional amount of oil will be removed from the cylinder face by the upper edge of groove 9, and that which seeps past these two scraping edges just referred to will be caught and scraped from the face of the cylinder by the upper edge of the slots or openings 7. The oil thus collected will pass through the openings 7 in the piston ring, thence through the openings 16 in the inner expander ring, and thence through the slot 18, or openings 19, in the piston to the interior thereof. On a reverse movement of the piston, of course, the upper edge of ring 6, the lower edge of groove 8, and the lower edge of the slots or openings 7 will act as the scraping edges, tending to remove the oil from the face of the cylinder.

The expander ring 12 by reason of the fact that it has bearing points equally spaced about the piston and the inner face of the oil ring 6 tends to force said oil ring outwardly and evenly about the entire length of the ring 6. Thus the ring 6 is held in close contact with the walls of the cylinder at all points, and with sufficient tension to scrape oil from the walls of the cylinder at all speeds, and furthermore, by virtue of the expander ring 12, the piston is centralized within the cylinder and the tendency to rock or move from side to side is lessened to a most marked degree. Of course, full and sufficient drainage of the oil which is scraped from the walls of the cylinder by the slots or openings 7, in the piston ring 6, is provided by means of the openings 16 in the expander ring and the ports 18 or 19 in the piston.

What is claimed is:

1. As a new article of manufacture an expander ring formed of thin sheet metal, said ring in outline having a series of flat faces, a second series of flat faces intermediate the first, said second series being relatively short as compared to the first or longer ones, and said long and short faces being connected by curved sections the radii of which is greater than the length of the short flat sections.

2. As a new article of manufacture an expander ring formed of thin sheet metal, said ring in outline having a series of flat faces, a second series of flat faces intermediate the first, said second series being relatively short as compared to the first or longer ones, and said long and short faces being connected by curved sections the radii of which is greater than the length of the short flat sections, said longer sections at least being provided with perforations extending therethrough.

In testimony whereof I have signed my name to this specification.

ALLEN W. MORTON.